US010875388B2

(12) United States Patent
Jungling et al.

(10) Patent No.: US 10,875,388 B2
(45) Date of Patent: Dec. 29, 2020

(54) LOCKING MECHANISM AND OPEN ROOF CONSTRUCTION PROVIDED THERE-WITH

(71) Applicant: Inalfa Roof Systems Group B.V., Oostrum (NL)

(72) Inventors: Rainer Gerhard Jungling, Monchengladbach (DE); Marcel Johan Christiaan Nellen, Merselo (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 16/401,432

(22) Filed: May 2, 2019

(65) Prior Publication Data

US 2019/0337368 A1 Nov. 7, 2019

(30) Foreign Application Priority Data

May 3, 2018 (DE) .................... 20 2018 102 477 U

(51) Int. Cl.
*B60J 7/043* (2006.01)
*B60J 7/057* (2006.01)
*B60J 7/02* (2006.01)

(52) U.S. Cl.
CPC .............. *B60J 7/024* (2013.01); *B60J 7/043* (2013.01); *B60J 7/0435* (2013.01); *B60J 7/057* (2013.01)

(58) Field of Classification Search
CPC . B60J 7/024; B60J 7/043; B60J 7/0435; B60J 7/057
USPC ........................................ 296/216.02–216.05
See application file for complete search history.

(56) References Cited

U.S. PATENT DOCUMENTS 8,870,276 B2 * 10/2014 Geurts .................... B60J 7/185
296/224

FOREIGN PATENT DOCUMENTS

| DE | 102011015833 A1 | 10/2012 |
|----|-----------------|---------|
| EP | 2607125 B1 | 6/2013 |
| JP | 2697875 B2 | 5/1990 |

OTHER PUBLICATIONS

German Search Report for German patent application No. 202018102477.9, dated May 3, 2018.

* cited by examiner

*Primary Examiner* — Dennis H Pedder
(74) *Attorney, Agent, or Firm* — Steven M. Koehler; Westman, Champlin & Koehler, P.A.

(57) ABSTRACT

A locking mechanism is provided with a locking lever for driving a movable member in a first direction and for locking it in a predetermined position and an operating part for controlling the movement of the locking lever, with cooperating cams and guides for controlling the movement of the locking lever also in a second direction and retaining means for retaining the locking lever in a specific position after a movement in said second direction. The retaining means comprise a retaining member which is movable between a retaining position and a release position. The movement of the retaining member between the retaining and release positions and vice versa is a result of a movement of the operating part.

18 Claims, 7 Drawing Sheets

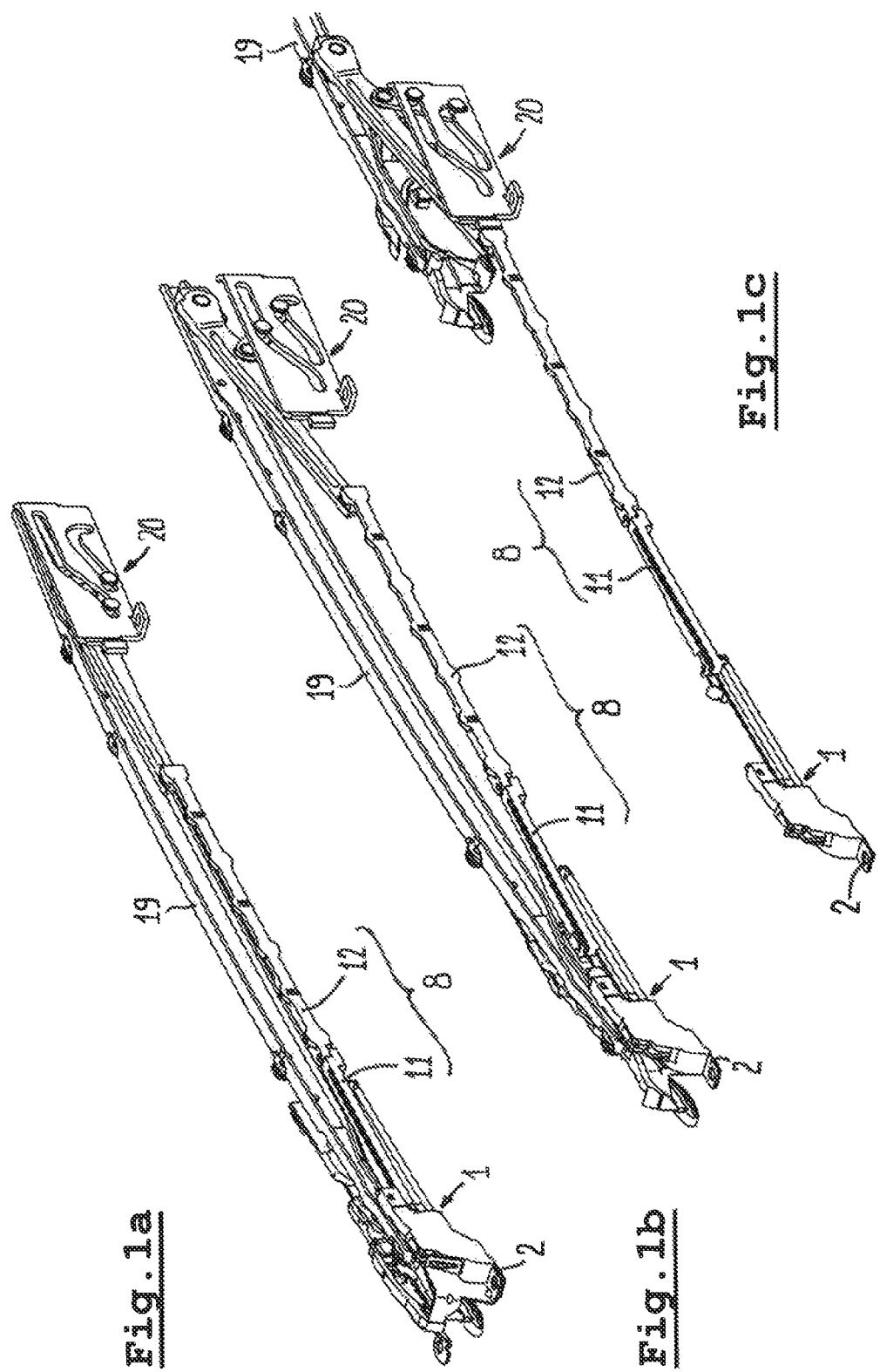

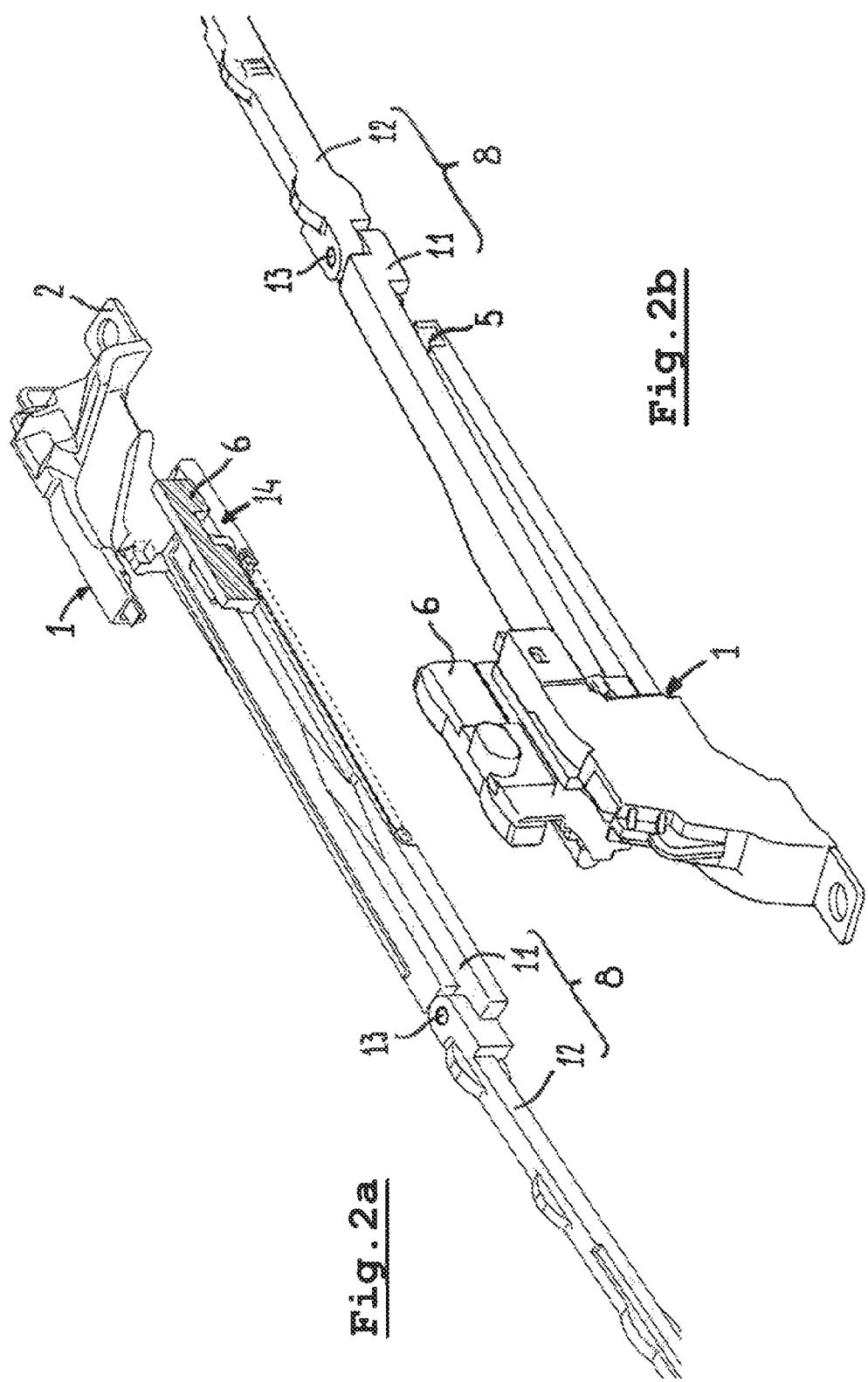

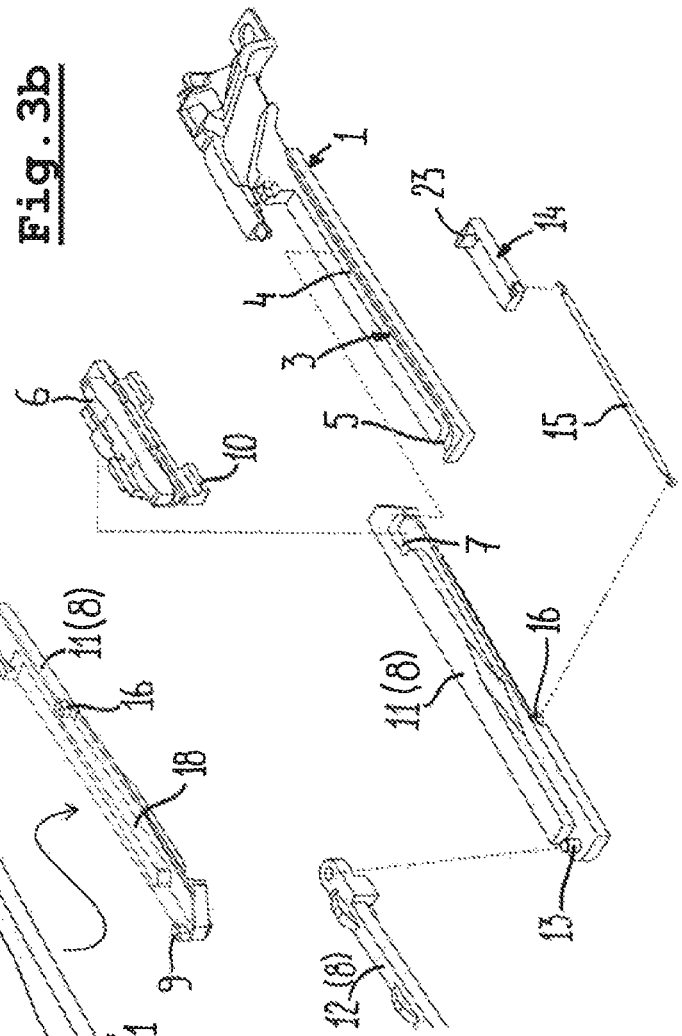
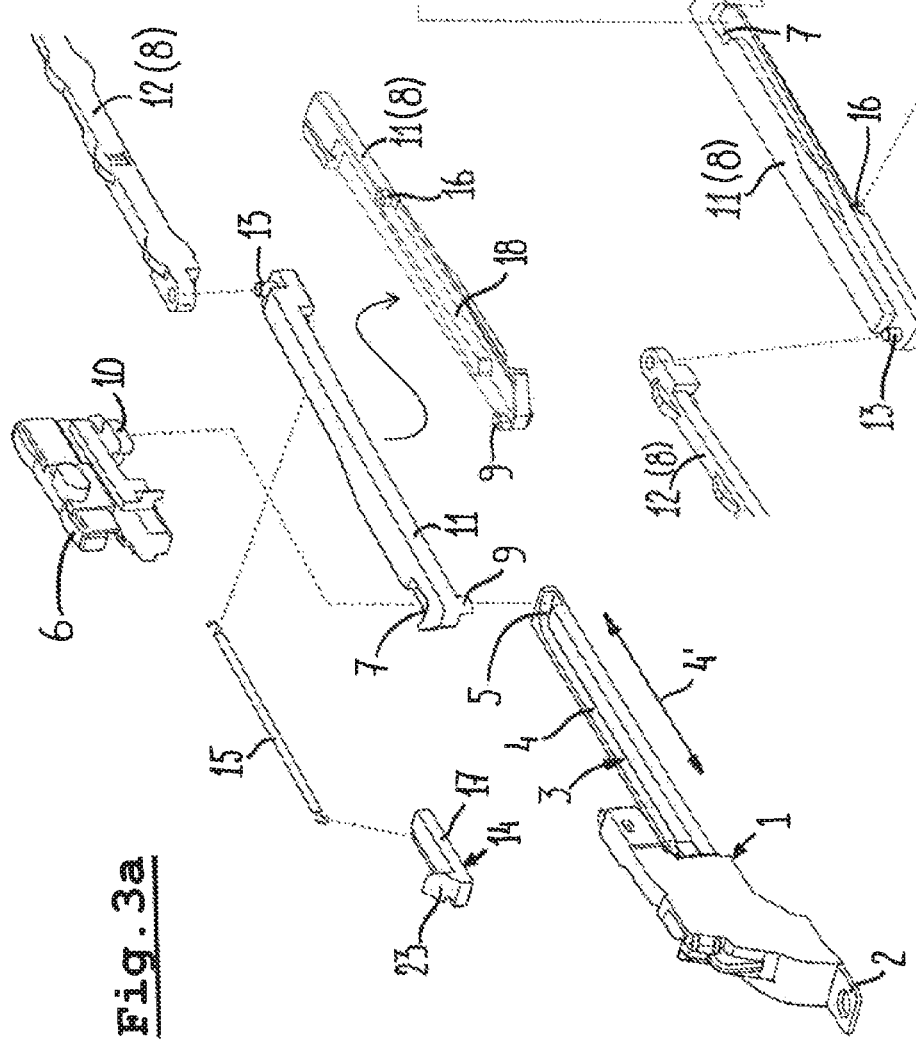

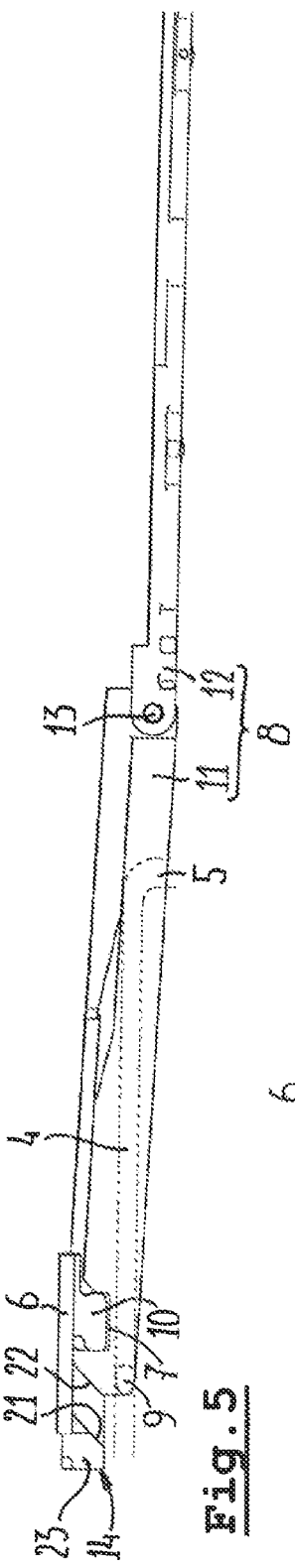
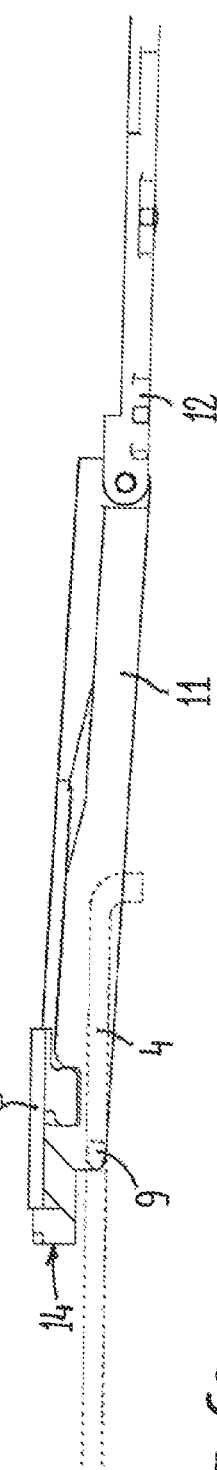
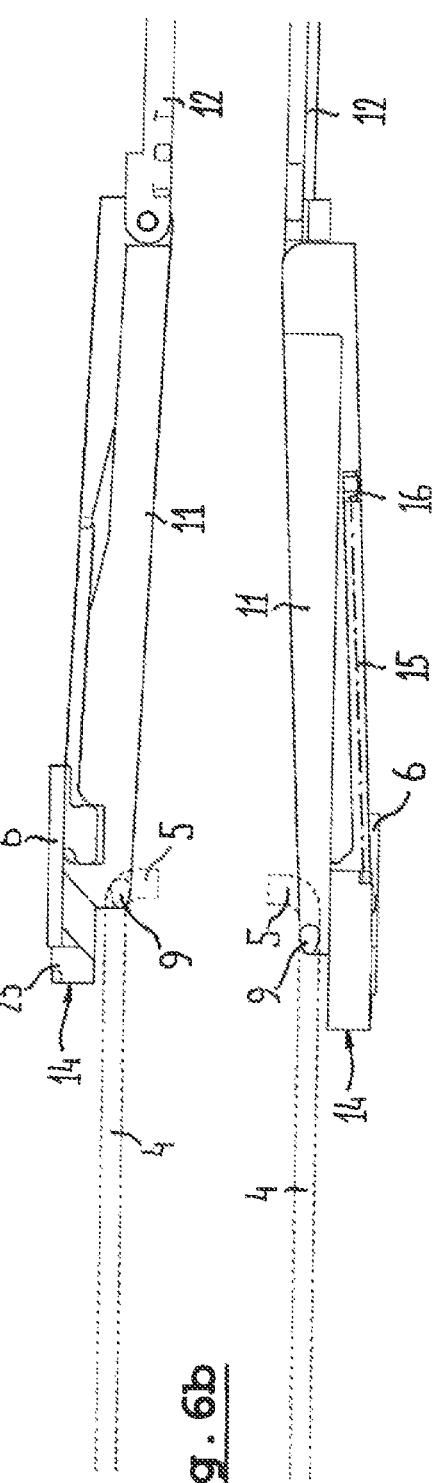
Fig. 4
Fig. 5
Fig. 6a
Fig. 6b

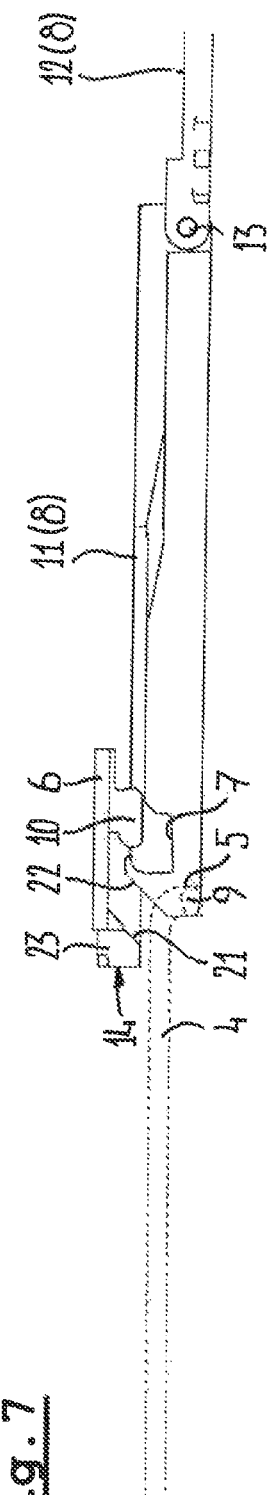
Fig. 7
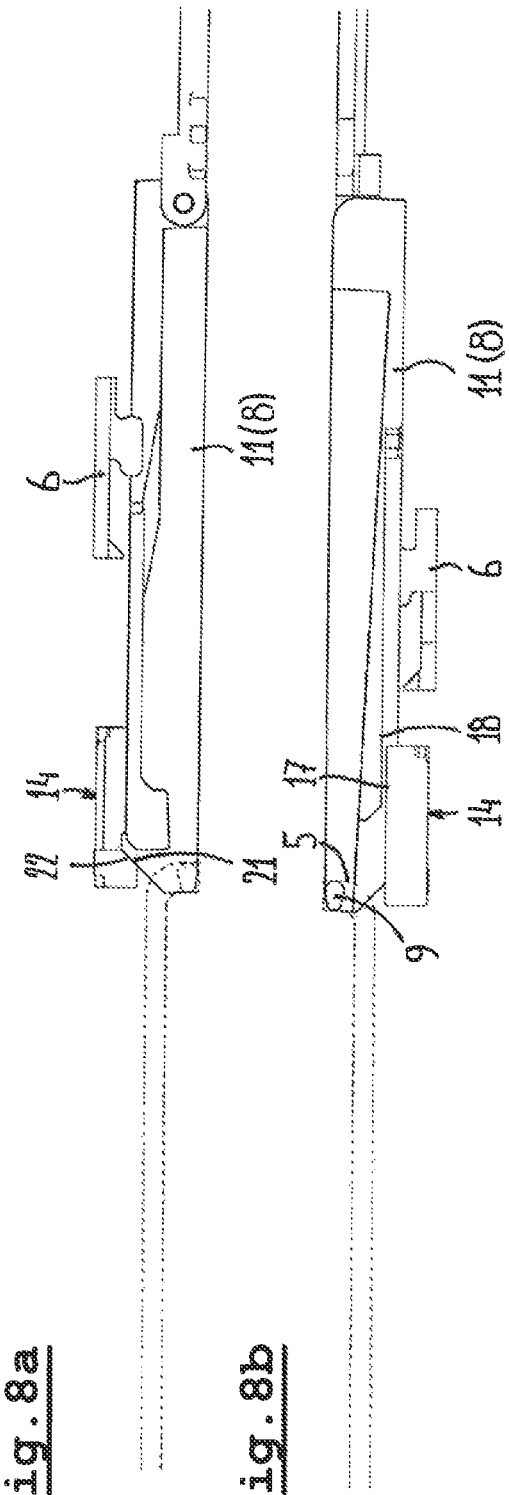
Fig. 8a
Fig. 8b

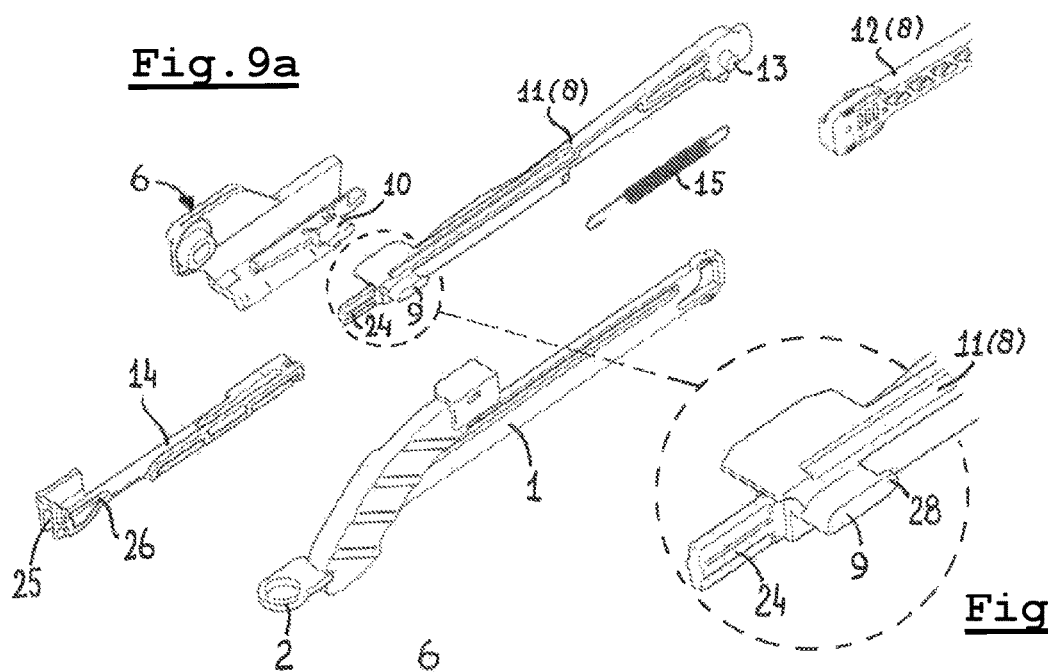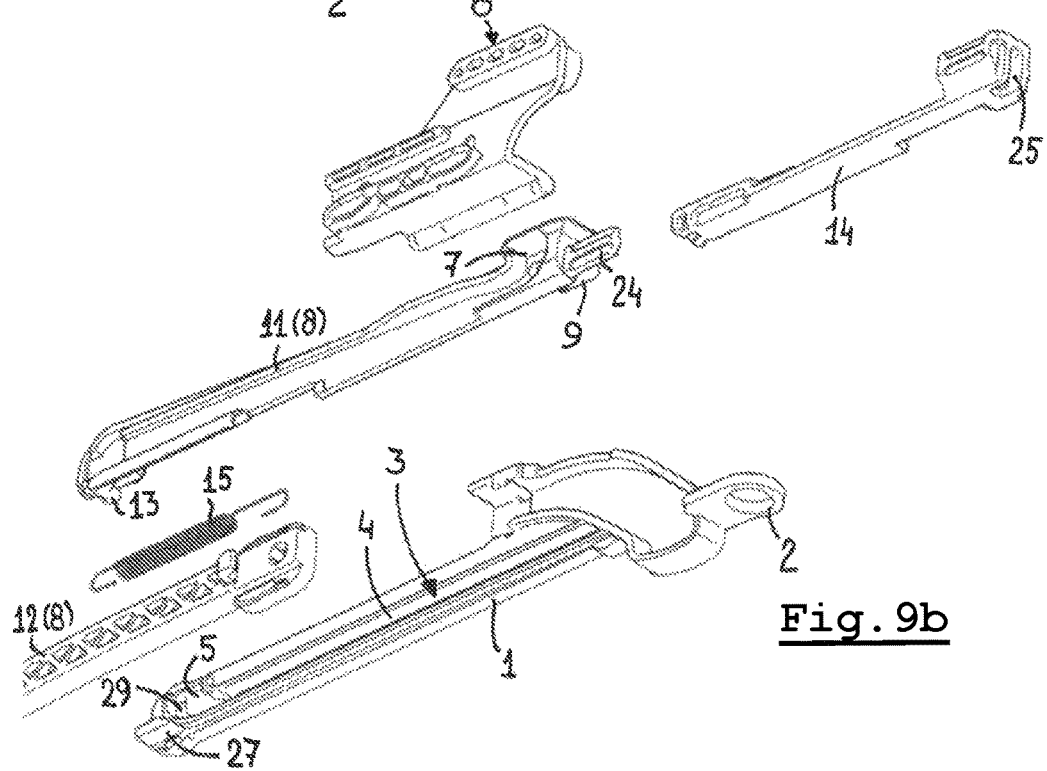

LOCKING MECHANISM AND OPEN ROOF CONSTRUCTION PROVIDED THERE-WITH

BACKGROUND

The discussion below is merely provided for general background information and is not intended to be used as an aid in determining the scope of the claimed subject matter.

In a first aspect the invention relates to a locking mechanism for a movable member of an open roof construction for a vehicle, comprising a stationary part which is provided with a first guide, a locking lever movable in a first direction for driving said movable member and for locking it in a predetermined position and an operating part movable in said first direction for controlling the movement of the locking lever, wherein the locking lever comprises a first cam cooperating with the first guide, which first guide comprises a first guide part extending in a direction substantially in parallel to said first direction and a second guide part connecting to said first guide part and extending in a second direction different from the first direction and capable of receiving the first cam of the locking lever for preventing a further movement of the locking lever in said first direction, wherein the locking lever and the operating part comprise an assembly of a second cam and a second curved guide wherein a cooperation between the second cam and the second curved guide is capable of generating a force on the locking lever in a first/second sense along the second direction when the operating part is moved in a first/second sense along said first direction, such that the first cam of the locking lever can move into/out of the second guide part of the first guide in said second direction while the second cam moves out of/into the second curved guide, such that, when the first cam is positioned in the first guide part, the locking lever moves in the first direction together with the operating part, whereas, when the first cam is positioned in the second guide part and the locking lever is prevented from moving in the first direction, the operating part is capable of moving further in said first direction without the locking lever and wherein further retaining means are provided which are capable of retaining the locking lever in the position in which the first cam is positioned in the second guide part of the first guide.

Such a locking mechanism is known from EP-B-2 607 125. The retaining means of this known locking mechanism comprise a locking spring member provided on the locking lever and preloaded to a locking position in which it engages a locking tab on the stationary part. The locking spring member is engageable by the operating part for a movement to an unlocked position.

This locking spring member moves in a vertical direction and as a result increases the constructional height of the locking mechanism and thus also of the open roof construction, which is a disadvantage because an increase of the constructional height reduces the available inner space in the passenger compartment of the vehicle there below. Further the locking spring member, as a result of its preload, already in its unlocked position loads the locking lever when latter is in a position in which it moves or can move in the first direction (hereinafter referred to as the unlocked position of the locking lever) and thus a position different from the position in which the first cam of the locking lever has entered the second guide part of the first guide (hereinafter referred to as the locked position of the locking lever). Thus, also in such an unlocked position the spring member already loads the locking lever, which may negatively influence the capability of latter to move from its unlocked towards its locked position.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In accordance with an aspect of the disclosure the locking mechanism has a retaining means that comprise a retaining member which substantially in said first direction is movable relative to the locking lever between a retaining position, when the first cam is positioned in the second guide part, for preventing a movement of the first cam of the locking lever in the second sense along the second direction out of the second guide part, and a release position for allowing such a movement of the first cam, wherein the movement of the retaining member between the retaining and release positions and vice versa in the first direction is a result of a movement of the operating part in said first direction, and wherein the operating part, in the release position, engages the retaining member in such a manner that the retaining member in said release position is incapable of generating a force on the locking lever in said second direction that would prevent a movement of the first cam in the second direction.

Because the retaining member in its release position cannot generate a force on the locking lever in said second direction that would prevent a movement of the first cam in the second direction, a movement of the first cam in said direction can be accomplished very easily, thus making the locking mechanism easy to operate. Further, the retaining member in its retaining position very effectively may lock the movement of the first cam out of the second guide part while minimizing the constructional complexity. Moreover, because the retaining member is movable substantially in the first direction (which is not vertically but horizontally), the constructional height of the locking mechanism can be kept at a minimum.

It is noted that within the scope of the present disclosure the second direction may extend substantially perpendicularly to the first direction (although this is not strictly necessary, such a direction seems to be most effective in preventing a further movement of the locking lever in the first direction once the first cam has entered the second guide part). Further said second direction may extend substantially horizontally, but it also is conceivable that said second direction extends substantially vertically. Further it is noted that an aspect of the invention intends to both cover embodiments in which the second cam is part of the operating part and the second curved guide is part of the locking lever and vice versa.

In one embodiment the retaining member for its movement relative to the locking lever is guided in a stationary guide and in its retaining position is located at least partially alongside the locking lever, as considered in said second direction, in such a manner that the retaining member in said retaining position can generate a force on the locking lever in said second direction and wherein the operating part in the release position engages the retaining member for keeping it out of engagement with the locking lever in such a manner that the retaining member in said release position cannot generate a force on the locking lever in said second direction.

In an unlocked position of the locking lever (in which the retaining member is in its release position) the locking lever is not loaded by the retaining member, thus allowing the locking lever to move more easily.

In one embodiment said stationary guide too guides the movement of the operating part in said first direction.

Thus a single guide may be used for guiding the operating part and the retaining member (keeping the construction as simple as possible with a minimum amount of parts).

In one embodiment the retaining member and the locking lever are provided with respective engagement surfaces extending substantially in said first direction and located such that these engagement surfaces in the retaining position of the retaining member are positioned at least partially alongside each other for thus preventing a movement of the first cam of the locking lever in the second sense along the second direction out of the second guide part.

Such engagement surfaces preferably will be planar surfaces. The position partially alongside each other means that these surfaces at least partially overlap each other in the retaining position such that they can directly transmit forces there between in the second direction (particularly forces preventing the locking lever to move in said second direction).

In one embodiment the retaining member and the locking lever are provided with stop means engaging each other in the retaining position of the retaining member for defining said retaining position. For example said stop means can be positioned such that in the retaining position the above-mentioned engagement surfaces will assume the required position alongside each other.

In such an embodiment it is conceivable that the stop means comprise respective inclined surfaces capable of generating an additional force on the locking lever for preventing a movement of the first cam of the locking lever in the second sense along the second direction out of the second guide part. Thus the stop means not only function for defining the required position of the retaining member, but also help in keeping the locking lever in its locked position.

It is noted that the first cam may be positioned on a first locking lever part which by means of a pivot, (living) hinge or similar means is pivotably connected to a second locking lever part which is designed to move in the first direction only. This also helps to minimize unwanted forces on the locking lever.

In another embodiment the retaining member for its movement in said first direction relative to the locking lever is guided on the locking lever by a guiding arrangement and wherein the retaining member is provided with a locking cam and the stationary part is provided with a locking cam guide, and wherein in the retaining position of the retaining member the locking cam engages the locking cam guide for generating a force on the locking lever counteracting a movement of the first cam of the locking lever in the second sense along the second direction out of the second guide part.

In this embodiment the retaining member is not guided in a stationary guide, but on the locking lever. This, firstly, simplifies the assembling procedure. Secondly the retaining member no longer slides over the bottom of a guide, such that dirt that would collect in such a guide does not have a negative influence on the movement of the retaining member. The cooperation between the locking cam and locking cam guide defines the position of the retaining member in its retaining position and thus of the locking lever (through the guiding engagement between the locking lever and the retaining member).

In one embodiment, then, it is possible that the retaining member and the locking lever comprise an assembly of cooperating guide pin extending in said first direction and guide aperture surrounding the guide pin, which assembly defines said guiding arrangement.

For example it is conceivable that the guide pin is part of the locking lever and the guide aperture is part of the retaining member. However, other solutions will be possible too within the context of the invention.

In a special embodiment the locking cam of the retaining member further is intended for, in the retaining position, directly engaging the first cam of the locking lever for generating a force on the locking lever counteracting a movement of the first cam of the locking lever in the second sense along the second direction out of the second guide part.

As a result the locking force is directly transmitted from the locking cam guide, through the locking cam of the retaining member, to the locking lever, thus bypassing the guiding arrangement (such as guide pin and guide aperture) which thus remains substantially unloaded for promoting the ease of the relative movement between the retaining member and locking lever and which also has to be constructed less strong.

In one embodiment the locking cam and the locking cam guide are provided with cooperating members for, in the retaining position of the retaining member, preventing a movement of the locking cam, and thus of the part of the retaining member connected therewith, in a direction substantially perpendicularly to both the first direction and second direction.

For example, when the second direction is a vertical direction, said third direction will extend horizontally in a transverse direction.

In one embodiment, then, the locking cam is provided with a hooked edge intended for engaging behind a protruding edge of the locking cam guide. The engagement only will occur when the locking cam engages the locking cam guide, thus when the retaining member is in (or very close to) its retaining position. Once the retaining member has left this position (and has moved or is moving towards the release position) these parts no longer will engage each other.

In an alternative embodiment the locking lever and the second guide part are provided with cooperating members for, in the retaining position of the retaining member, preventing a movement of the locking lever in a direction substantially perpendicularly to both the first direction and second direction.

For example it is possible that the first cam of the locking lever is provided with a protrusion extending substantially in the first direction and intended for engaging behind a protruding edge of the second guide part. Also in this case the engagement only will occur when the locking cam engages the locking cam guide, thus when the retaining member is in (or very close to) its retaining position. Once the retaining member has left this position (and has moved or is moving towards the release position) these parts no longer will engage each other.

A combination of these embodiments (locking cam and locking cam guide provided with such cooperating members or locking lever and second guide part part provided with such cooperating members) is conceivable too.

The retaining member may be spring-loaded towards its retaining position by a spring. This means that in its release position the retaining member is urged against the operating part, thus assuring a well-defined rattle free position as well as an automatic movement of the retaining member towards its retaining position when the operating part moves.

In one embodiment the spring is a tension spring of which a first end is connected to the retaining member and of which a second end is connected to the locking lever. This, however, does not preclude the use of other types of springs, or the connection of the second end of the spring to a different element (for example to the operating part).

Further the spring may be positioned in such a manner that the spring force acts substantially in the first direction only. This assures that the locking lever will not be loaded by the spring in a direction other than the first direction (such as the second direction).

In a second aspect the invention relates to an open roof construction for a vehicle which is provided with a locking mechanism.

BRIEF DESCRIPTION OF THE DRAWINGS

Hereinafter aspects of the invention will be elucidated while referring to the drawings, in which:

FIGS. 1a-1c illustrate a first embodiment of the locking mechanism in three different positions;

FIGS. 2a and 2b in part illustrate the forward part of the first embodiment of the locking mechanism in two views from opposite sides;

FIGS. 3a and 3b illustrate the constitutive parts of the first embodiment of the locking mechanism in a taken apart position and in two views from opposite sides;

FIGS. 4, 5, 6a, 6b, 7, 8a, and 8b schematically illustrate different positions of the first embodiment of the locking mechanism;

FIGS. 9a and 9b illustrate the constitutive parts of a second embodiment of the locking mechanism in a taken apart position and in two views from opposite sides, with an additional enlarged view (FIG. 9c) of a frontal part of the locking lever;

DETAILED DESCRIPTION OF ILLUSTRATIVE EMBODIMENT

Figure 10:
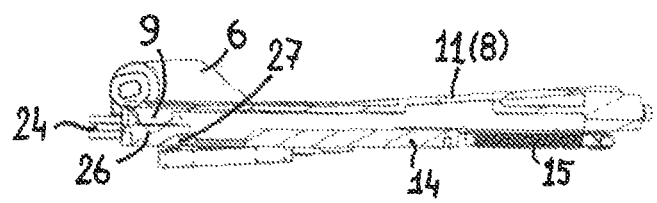
FIG. 10 shows a schematic side elevational view of the second embodiment of the locking mechanism in a retaining position.

Firstly referring to FIGS. 1a-1c, 2a-2b, 3a and 3b, the constitutive parts of a first embodiment of the the locking mechanism will be explained. The locking mechanism is meant for locking part of the movement of a movable member of an open roof construction for a vehicle (such as the lifting movement of a movable roof panel for opening and closing a roof opening, which panel for example is provided with a curve 19 of which a rear part can be lifted by a lifting mechanism 20).

The locking mechanism comprises a stationary part 1 (which by mounting means 2 may be attached to a stationary roof part of the vehicle—not illustrated—) which is provided with a first guide 3 with a first guide part 4 extending in a first direction 4' and a second guide part 5 connecting to the first guide part and (in the present embodiment) extending in a second direction substantially perpendicularly to the first direction 4'.

It is noted that the second direction may extend in different ways, such as horizontally or vertically. In the first embodiment the second direction extends substantially horizontally, whereas in a second and third embodiment to be described later it extends vertically.

Further a locking lever 8 is provided which in general is movable in said first direction 4' for operating the lifting mechanism 20 and thus driving the curve 19 of the movable roof panel and which is capable of locking the lifting mechanism 20 in a predetermined position (as illustrated in FIGS. 1c, 7 and 8). In the illustrated embodiment the locking lever 8 comprises a (forward) first locking lever part 11 which by means of a pivot 13 (or similar part, such as hinge or living hinge) is pivotally connected to a (rearward) second locking lever part 12 which is designed to move in the first direction 4' only, whereas the first locking lever part 11 can move in the first direction as well as in a direction inclined therewith as caused by the second guide part 5 (as will be explained below).

Where in the following description the locking lever 8 is mentioned, this generally will mean the forward locking lever part 11.

It is noted that in FIG. 3a the first locking lever part 11 has been illustrated twice (as indicated by a curved arrow): in its normal position (left) and in an upside down position (right) for showing additional details.

Also provided is an operating part 6 (in FIG. 2a only illustrated in part for enabling the view of other parts of the mechanism) which also is movable in said first direction 4' for controlling the movement of the locking lever 8.

The locking lever 8 comprises a first cam 9 (see FIG. 3a) cooperating with the first guide 3. As stated above, the first guide 3 comprises a first guide part 4 and a second guide part 5 connecting to said first guide part 4 and extending in a second direction different from the first direction and capable of receiving the first cam 9 of the locking lever 8 for preventing a further movement of the locking lever in said first direction (as will appear below).

Further (as illustrated best in FIGS. 3a and 3b) the locking lever 8 and the operating part 6 comprise an assembly of a second curved guide 7 and a second cam 10 (of which the positions in an alternative embodiment may be switched), respectively. A cooperation between the second cam and the second curved guide is capable of generating a force on the locking lever 8 in a first/second sense along the second direction when the operating part 6 is moved in a first/second sense along said first direction 4'. As a result the first cam 9 of the locking lever 8 can move into/out of the second guide part 5 of the first guide 3 in said second direction while the second cam 10 moves out of/into the second curved guide 7, such that, when the first cam 9 is positioned in the first guide part 4, the locking lever 8 moves in the first direction 4' together with the operating part 6, whereas, when the first cam 9 is positioned in the second guide part 5 and the locking lever 8 is prevented from moving in the first direction, the operating part 6 is capable of moving further in said first direction for (in a manner not shown but known per se for such types of open roof constructions) longitudinally moving the roof panel while the lifted (tilt) position remains the same.

For additional details of such known parts of the locking mechanism and the manner in which the operating part 6 cooperates with the stationary part 1 and the locking lever 8 for moving the latter between its unlocked and locked positions, and vice versa, reference is made to EP-B-2 607 125.

The locking mechanism further comprises retaining means for retaining the locking lever 8 in the position in which the first cam 9 is positioned in the second guide part 5 of the first guide 3. The specific design of these retaining means is an important feature.

Referring to FIGS. 2a, 2b, 3a and 3b specifically, said retaining means, in the first embodiment, comprise a retaining member 14 (for example a sliding block which may slide within a stationary guide—not illustrated—which may be the same guide as used for guiding the movement of the operating part 6). Said retaining member substantially in said first direction 4' is movable between a retaining position at least partially alongside the locking lever 8 (to be explained below with reference to FIGS. 8a and 8b), as considered in said second direction, for preventing a movement of the first cam 9 of the locking lever 8 in the second sense along the second direction out of the second guide part 5, and a release position (for example as illustrated in FIG. 4) for allowing such a movement of the first cam 9 of the locking lever 8 out of the second guide part 5 and towards the first guide part 4.

The retaining member 14 in said retaining position can generate a force on the locking lever 8 in the second direction, whereas the operating part 6 in the release position engages the retaining member 14 for keeping it out of engagement with the locking lever in such a manner that the retaining member in said release position cannot generate a force on the locking lever in said second direction.

As will be explained below, the movement of the retaining member 14 between the retaining and release positions and vice versa in the first direction 4' is a result of a movement of the operating part 6.

The retaining member 14 is spring-loaded towards its retaining position by a tension spring 15 of which a first end is connected to the retaining member and of which a second end is connected to the locking lever 8 (e.g. through a pin 16 on the locking lever). Preferably said tension spring 15 extends substantially in the first direction 4'.

Again referring to FIGS. 3a and 3b (and as visible too in FIG. 8b), the retaining member 14 and the locking lever 8 are provided with respective engagement surfaces 17 and 18 extending substantially in said first direction 4' and located such that these engagement surfaces in the retaining position of the retaining member are positioned at least partially alongside each other for thus preventing a movement of the first cam 9 of the locking lever 8 in the second sense along the second direction out of the second guide part 5.

Further the retaining member 14 and the locking lever 8 are provided with stop means 21,22 engaging each other in the retaining position of the retaining member for defining said retaining position. In the illustrated embodiment said stop means comprise respective inclined surfaces 21 and 22 which are capable of generating an additional force on the locking lever 8 for preventing a movement of the first cam 9 of the locking lever in the second sense along the second direction out of the second guide part 5. The stop means/inclined surface 21 of the retaining member is provided on a protrusion 23 of the retaining member (which protrusion also will serve as the engagement location between the retaining member 14 and the operating part 6), whereas the stop means/inclined surface 22 of the operating part 6 is provided on a respective frontal part of the operating lever.

The manner in which the present locking mechanism in its first embodiment operates will be explained while referring to FIGS. 4, 5, 6a, 6b, 7, 8a and 8b.

In FIG. 4 the locking mechanism assumes a forward position, for example a position in which a roof panel fully closes the roof opening (and in which the lifting mechanism 20 is in its lowermost position in accordance with FIG. 1a). The first cam 9 of the locking lever 8 (more specifically of the first locking lever part 11 thereof) is located in the first guide part 4 of the first guide 3 and the second cam 10 of the operating part is located in the second curved guide 7 of the locking lever 8. The retaining member 14 is kept out of engagement with the locking lever 8 (specifically the inclined surface 22 and the engagement surface 18 thereof) by engagement with the operating part 6 (in this embodiment the protrusion 23 of the retaining member 14 is kept into engagement with the operating part by the tension spring 15).

In FIG. 5 the mechanism has assumed a position (for example a position in which the lifting mechanism 20 has been lifted in accordance with FIG. 1b, such that the roof panel is lifted at its rear end to a so-called tilt position) in which the operating part 6 has moved the locking lever backward (in the figure to the right) along the first guide part 4. The relative positions between the operating part 6, locking lever 8 and retaining member 14 have not changed.

In FIG. 6a the mechanism starts to enter the locked position. The first cam 9 has reached the transition between the first guide part 4 and the second guide part 5. In FIG. 6b a view from below is illustrated just before reaching the position of FIG. 6a. One can see the tension spring 15 (schematically represented by a dot-dashed line) keeping the protrusion 23 of the retaining member in contact with the operating part 6.

In FIG. 7 the first cam 9, through a pivotal movement of the first locking lever part 11 around pivot 13, has moved in the second direction into the second guide part 5. At the same time the second cam 10 of the operating part 6 has left the second curved guide 7 of the locking lever, such that the operating part 6 now can move on while the locking lever 8 remains in the position achieved at this moment.

Such an ongoing movement of the operating part 6 (which may cause the panel to slide along to a position for further or completely freeing the roof opening of the vehicle) will result in a situation in which the inclined surfaces 21 and 22 of the retaining member 14 and locking lever 8 (specifically its first locking lever part 11) engage each other for defining the end position of the retaining member relative to the locking lever in which the respective engagement surfaces 17 and 18 are positioned (at least partially) alongside each other (overlap each other at least partially), as illustrated in FIG. 8a. This prevents that the first cam 9 of the locking lever can move back out of the second guide part 5. In FIG. 8b a similar locked position is illustrated, but in which the operating part 6 has not yet moved as far as in FIG. 8a.

The cooperation between the engagement surfaces 17 and 18 and between the inclined surfaces 21 and 22 assures that the locking lever 8 remains in the required (locked) position. Only when the operating part 6 is again moved forward (to the left) and engages the retaining member 14 for moving it forward relative to and out of engagement with the locking lever 8, the first cam 9 again can move out of the second guide part 5 (generally as a result of a force generated by the second cam 10 entering the second curved guide 7). Then the locking lever is again free to move forward together with the operating part (with a resulting movement of the lifting mechanism 20).

It is noted that the moment on which the engagement surfaces 17 and 18 will start to overlap, can be varied and, for example, may occur at an earlier or later stage, as a result of a specific design of, for example, the engaging parts of the retaining member and operating part.

Next reference is made to FIGS. 9a and 9b which illustrates the constitutive parts of a second embodiment of the locking mechanism (in the top part of FIG. 9a in a perspective view from above and in the lower part of FIG. 9b in a perspective view from below). Unless stated otherwise, parts similar to the parts of the first embodiment are provided with similar reference numbers and for a detailed discussion of these parts and their function/operation reference is made to the above discussion of the first embodiment.

As such, the second embodiment comprises a stationary part 1 (with mounting means 2) provided with a first guide 3 defining a first guide part 4 and second guide part 5. An operating part 6 is provided as well as a locking lever 8 comprising a forward part 11 and rearward part 12, for example pivotably connected through a pivot 13. The locking lever 8 (specifically its forward part 11) is provided with a first cam 9 for cooperation with the first guide 3. The operating part 6 and locking lever 8 comprise an assembly of second cam 10 for cooperation with a second curved guide 7 of the locking lever.

Further a retaining member 14 is illustrated which for its movement in said first direction relative to the locking lever 8 is guided on the locking lever 8 by a guiding arrangement which in this embodiment comprises a guide pin 24 protruding from the locking lever 8 in said first direction and a guide aperture 25 provided in the retaining member 14 and intended for surrounding the guide pin 24. As in the first embodiment, a tension spring 15 is provided for tensioning the retaining member 14.

The retaining member 14 further is provided with a locking cam 26, whereas the stationary part 1 is provided with a locking cam guide 27. In the retaining position of the retaining member 14 the locking cam 26 will engage the locking cam guide 27 to be able to generate a force on the locking lever 8 counteracting a movement of the first cam 9 of the locking lever in the second sense (here downwards) along the second direction (here vertically) out of the second guide part 5. This is illustrated in FIG. 10 showing a side elevational view of a part of the locking mechanism in the retaining position. The locking cam 26 rests upon the locking cam guide 27 and supports the first cam 9 of the locking lever 8 which then resides in the second guide part 5. Forces are thus directly transmitted from the locking cam guide 27 through the locking cam 26 towards the first cam 9 of the locking lever without the need of any force transfer via the guide pin 24 and guide aperture 25. As a result, the first cam 9 is prevented from moving downwards out of the second guide part 5. Only after the retaining member 14 (by being forced by the operating part 6) is moved towards its release position (such that the locking cam 26 in FIG. 10 moves to the left) by sliding with its guide aperture 25 over the guide pin 24 of the locking lever 8, the first cam 9 is released and will move out of the second guide part 5 (as a result of a cooperation between the second cam 10 of the operating part 6 and the second curved guide 7 of the locking lever 8, as discussed previously with respect to the first embodiment).

Thus, in this second embodiment the locking cam 26 of the retaining member 14 is intended for, in the retaining position, directly engaging the first cam 9 of the locking lever 8 for generating a force on the locking lever counteracting a movement of the first cam 9 of the locking lever 8 in the second sense along the second direction out of the second guide part 5.

In this embodiment the locking lever 8 and the second guide part 5 further are provided with cooperating members for, in the retaining position of the retaining member 14, preventing a movement of the locking lever 8 in a direction substantially perpendicularly to both the first direction and second direction (for example in a transverse horizontal direction when the second direction extends substantially vertically). Specifically the first cam 9 of the locking lever 8 is provided with a protrusion 28 (best visible in the enlarged view of the forward end of the locking lever in FIG. 9c) extending substantially in the first direction and intended for engaging behind a protruding edge 29 of the second guide part 5 when the first cam 9 is positioned in said second guide part 5.

Figure 11:
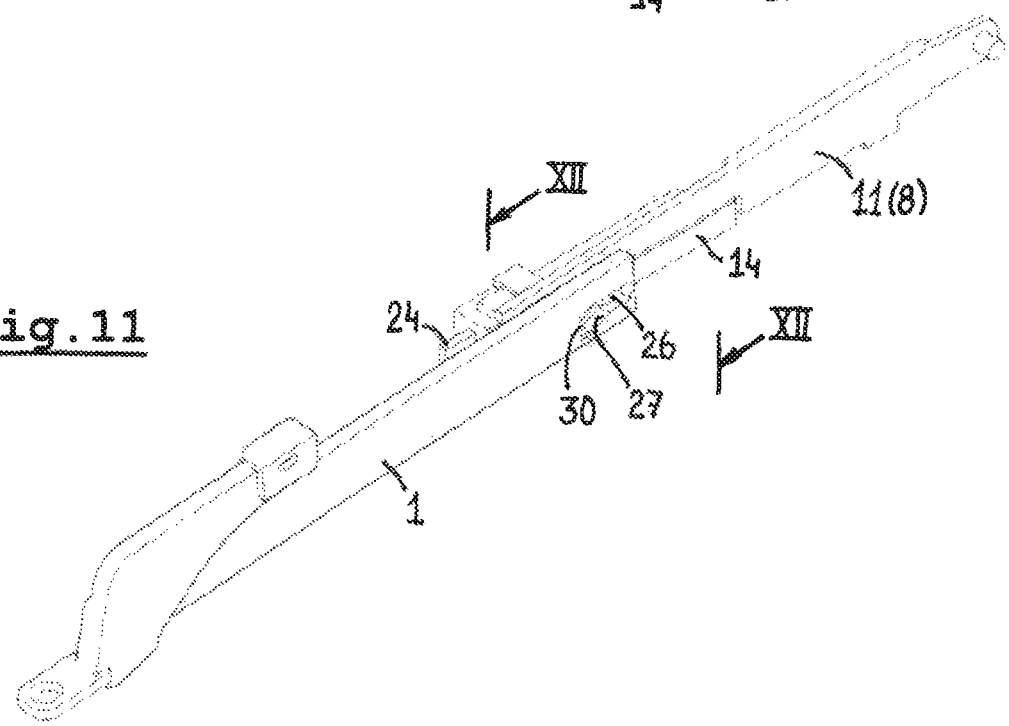
FIG. 11 illustrates a schematic perspective view of a third embodiment of the locking mechanism, and FIG. 12 schematically illustrates a cross section according to XII-XII in FIG. 11.
Figure 12:
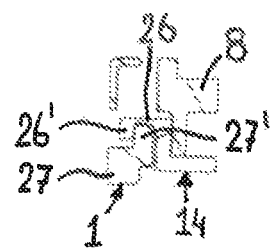

In FIG. 11 a schematic perspective view of part of a third embodiment is illustrated, in which not all parts of the locking mechanism are illustrated, but only those which are essential for explaining the characteristics of this embodiment. This embodiment for its greater part corresponds with the second embodiment and thus similar parts are not discussed again. FIG. 11 shows a window 30 in the stationary part 1 (which window basically forms part, for example an open bottom, of the second guide part 5), through which the locking cam 26 of the retaining member 14 and the locking cam guide 27 of the stationary part 1 are visible in an engaging position (retaining member 14 in its retaining position). In this third embodiment, unlike the second embodiment, a protrusion 28 on the first cam 9 is not provided, nor a protruding edge 29' on the second guide part 5. Instead, the locking cam 26 and the locking cam guide 27 now are provided with cooperating members. Specifically the locking cam 26 has a hooked edge 26' and the locking cam guide 27 has a protruding edge 27', as illustrated in FIG. 12 showing a schematic cross section according to XII-XII in FIG. 11. The hooked edge 26' may hook behind the protruding edge 27', thus preventing a movement of the locking lever 8 in a direction substantially perpendicularly to both the first direction and second direction (for example in a transverse horizontal direction).

The invention is not limited to the embodiments described before which may be varied widely within the scope of the invention as defined by the appending claims.

The invention claimed is:

1. A locking mechanism for a movable member of an open roof construction for a vehicle, comprising a stationary part which is provided with a first guide, a locking lever movable in a first direction configured to drive said movable member and for locking said movable member in a predetermined position and an operating part movable in said first direction configured to control the movement of the locking lever, wherein the locking lever comprises a first cam cooperating with the first guide, which first guide comprises a first guide part extending in a direction substantially in parallel to said first direction and a second guide part connecting to said first guide part and extending in a second direction different from the first direction and capable of receiving the first cam of the locking lever for preventing a further movement of the locking lever in said first direction, wherein the locking lever and the operating part comprise an assembly of a second cam and a second curved guide, wherein a cooperation between the second cam and the second curved guide is capable of generating a force on the locking lever in a first/second sense along the second direction when the operating part is moved in a first/second sense along said first direction, such that the first cam of the locking lever moves into/out of the second guide part of the first guide in said second direction while the second cam moves out of/into the second curved guide, such that, when the first cam is positioned in the first guide part, the locking lever moves in the first direction together with the operating part whereas, when the first cam is positioned in the second guide part and the locking lever is prevented from moving in the first direction, the operating part is capable of moving further in said first direction without the locking lever, and wherein further retaining means are provided which are capable of retaining the locking lever in the position in which the first cam is positioned in the second guide part of the first guide, wherein said retaining means comprise a retaining member which substantially in said first direction is movable relative to the locking lever between a retaining position, when the first cam is positioned in the second guide part, for preventing a movement of the first cam of the locking lever in the second sense along the second direction out of the second guide part, and a release position for allowing such a movement of the first cam, wherein the movement of the retaining member between the retaining and release positions and vice versa in the first direction is a result of a movement of the operating part in said first direction, and wherein the operating part, in the release position, engages the retaining member in such a manner that the retaining member in said release position is incapable of generating a force on the locking lever in said second direction that would prevent a movement of the first cam in the second direction.

2. The locking mechanism according to claim 1, wherein the retaining member for its movement relative to the locking lever is guided in a stationary guide and in its retaining position is located at least partially alongside the locking lever, as considered in said second direction, in such a manner that the retaining member in said retaining position generates a force on the locking lever in said second direction and wherein the operating part in the release position engages the retaining member for keeping it out of engagement with the locking lever in such a manner that the retaining member in said release position cannot generate a force on the locking lever in said second direction.

3. The locking mechanism according to claim 2, wherein said stationary guide also guides the movement of the operating part in said first direction.

4. The locking mechanism according to claim 2, wherein the retaining member and the locking lever are provided with respective engagement surfaces extending substantially in said first direction and located such that these engagement surfaces only in the retaining position of the retaining member are positioned at least partially alongside each other for thus preventing a movement of the first cam of the locking lever in the second sense along the second direction out of the second guide part.

5. The locking mechanism according to claim 2, wherein the retaining member and the locking lever are provided with a stop engaging each other in the retaining position of the retaining member for defining said retaining position.

6. The locking mechanism according to claim 1, wherein the retaining member for its movement in said first direction relative to the locking lever is guided on the locking lever by a guiding arrangement and wherein the retaining member is provided with a locking cam and the stationary part is provided with a locking cam guide, and wherein in the retaining position of the retaining member the locking cam engages the locking cam guide for generating a force on the locking lever counteracting a movement of the first cam of the locking lever in the second sense along the second direction out of the second guide part.

7. The locking mechanism according to claim 6, wherein the retaining member and the locking lever comprise an assembly of cooperating guide pin extending in said first direction and guide aperture surrounding the guide pin, which assembly defines said guiding arrangement.

8. The locking mechanism according to claim 7, wherein the guide pin is part of the locking lever and the guide aperture is part of the retaining member.

9. The locking mechanism according to claim 6, wherein the locking cam of the retaining member further is intended for, in the retaining position, directly engaging the first cam of the locking lever for generating a force on the locking lever counteracting a movement of the first cam of the locking lever in the second sense along the second direction out of the second guide part.

10. The locking mechanism according to claim 6, wherein the locking cam and the locking cam guide are provided with cooperating members for, in the retaining position of the retaining member, preventing a movement of the locking cam, and thus of the part of the retaining member connected therewith, in a direction substantially perpendicularly to both the first direction and second direction.

11. The locking mechanism according to claim 10, wherein the locking cam is provided with a hooked edge intended for engaging behind a protruding edge of the locking cam guide.

12. The locking mechanism according to claim 6, wherein the locking lever and the second guide part are provided with cooperating members for, in the retaining position of the retaining member, preventing a movement of the locking lever in a direction substantially perpendicularly to both the first direction and second direction.

13. The locking mechanism according to claim 12, wherein the first cam of the locking lever is provided with a protrusion extending substantially in the first direction and intended for engaging behind a protruding edge of the second guide part.

14. The locking mechanism according to claim 1, wherein the retaining member is spring-loaded towards its retaining position by a spring.

15. The locking mechanism according to claim 14 wherein the spring is tension spring of which a first end is connected to the retaining member and of which a second end is connected to the locking lever.

16. The locking mechanism according to claim 15 wherein the spring is positioned in such a manner that the spring force acts substantially in the first direction only.

17. The locking mechanism according to claim 5 wherein the stop comprise respective inclined surfaces capable of additionally generating a force on the locking lever counteracting a movement of the first cam of the locking lever in the second sense along the second direction out of the second guide part.

18. The open roof construction for a vehicle, provided with a locking mechanism according to claim 1.

* * * * *